United States Patent
Sekiyama (10) Patent No.: US 9,786,135 B1
(45) Date of Patent: Oct. 10, 2017

(54) RADIO APPARATUS

(71) Applicant: ICOM INCORPORATED, Hirano-ku, Osaka (JP)

(72) Inventor: Yoshio Sekiyama, Osaka (JP)

(73) Assignee: ICOM INCORPORATED, Osaka (JP)

( * ) Notice: Subject to any disclaimer, the term of this patent is extended or adjusted under 35 U.S.C. 154(b) by 0 days.

(21) Appl. No.: 15/449,154

(22) Filed: Mar. 3, 2017

(30) Foreign Application Priority Data

Jun. 29, 2016 (JP) ................................ 2016-128955

(51) Int. Cl.
| | |
|---|---|
| *G08B 3/10* | (2006.01) |
| *G01S 19/17* | (2010.01) |
| *G08B 25/01* | (2006.01) |
| *G01S 5/00* | (2006.01) |
| *B60K 35/00* | (2006.01) |
| *B60R 25/04* | (2013.01) |

(52) U.S. Cl.
CPC .......... *G08B 3/1016* (2013.01); *G01S 5/0027* (2013.01); *G01S 19/17* (2013.01); *G08B 25/016* (2013.01); *B60K 35/00* (2013.01); *B60R 25/04* (2013.01)

(58) Field of Classification Search
CPC .... G08B 3/1016; G08B 25/016; B60K 35/00; B60R 25/04; B60R 25/102; B60R 25/33; G01S 19/17; G01S 5/0027

USPC .......... 340/7.5, 988, 426.14, 426.19, 426.2, 340/426.21, 426.28

See application file for complete search history.

(56) References Cited

U.S. PATENT DOCUMENTS

| | | | | |
|---|---|---|---|---|
| 5,914,675 A | * | 6/1999 | Tognazzini | ........... G01S 5/0027 340/426.19 |
| 6,028,537 A | * | 2/2000 | Suman | ................... B60K 35/00 340/426.14 |

FOREIGN PATENT DOCUMENTS

| | | |
|---|---|---|
| JP | H05-9045 U | 2/1993 |
| JP | 2002-111520 A | 4/2002 |

* cited by examiner

*Primary Examiner* — Ali Neyzari
(74) *Attorney, Agent, or Firm* — Pearne & Gordon LLP (57) ABSTRACT

A radio apparatus includes a control unit, a power unit, a distress key and a transmission unit. When the distress key is manipulated, a distress key manipulation signal is output to the control unit and the power unit. When the power unit receives the distress key manipulation signal during a power supply is stopped, the power unit supplies power to the control unit and the transmission unit. When the control unit receives power from the power unit, the control unit starts setting up the radio apparatus and counts a time that the control unit continuously receives the distress key manipulation signal. When the control unit continuously receives the distress key manipulation signal for a preset time or longer, the control unit outputs a power supply maintenance signal to the power unit, generates the distress signal, and causes the transmission unit to send the distress signal.

8 Claims, 5 Drawing Sheets

RADIO APPARATUS

CROSS-REFERENCES TO RELATED APPLICATION(S)

This application is based on and claims priority from Japanese Patent Application No. 2016-128955 filed on Jun. 29, 2016, the entire contents of which are incorporated herein by reference.

BACKGROUND

1. Field of the Invention

The present invention relates to a radio apparatus capable of quickly sending a distress signal in an emergency in which transmission of the distress signal is necessary without requiring a user to manipulate a power key even if a power unit is off.

2. Description of Related Art

Radio apparatuses for ships having a digital selective calling (DSC) function are also provided with a function of sending a distress signal in an emergency that the ship or a person(s) is in distress and requires rescue. Such radio apparatuses are equipped with a distress key for sending a distress signal, independently of the other switches.

The distress key is provided with a switch cover so that a distress signal is not sent by an inadvertent manipulation thereof, and the distress key itself or the switch cover is colored in red. Such radio apparatuses are configured in such a manner that the distress signal is not sent unless the distress key is manipulated continuously for three seconds. That is, a distress signal is sent only when a series of manipulations is made that the switch cover is opened and then the distress key is manipulated continuously for three seconds.

The distress signal includes MMSI (maritime mobile service identity) which is an ID code of the self station and is a 9-digit numeral, information indicating a position of the self station, time information, and a distress type. There are eleven distress types, that is, fire/explosion ("explosion"), "flooding", "collision", "grounding", "capsizing", "sinking", incapability of steering the ship/adrift ("adrift"), "piracy", abandoning of the ship ("abandoning"), man overboard ("MOB"), and "undesignated distress".

The function of sending such a distress signal may be provided not only in radio apparatuses for ships but also in certain radio apparatuses for use on land.

JP-A-2002-111520 and JP-UM-A-05-009045 disclose radio apparatuses having a distress key for causing transmission of a distress signal of the above kind.

However, not only in the radio apparatuses disclosed in JP-A-2002-111520 and JP-UM-A-05-009045 but also in other conventional radio apparatuses having a function of sending a distress signal, it is assumed that the distress key is manipulated in a state that the radio apparatus is powered on. That is, no distress signal is sent if the distress key is manipulated in a state that the radio apparatus is powered off.

To send a distress signal from a state that the radio apparatus is powered off, it is necessary to perform a series of manipulations of turning the power on by manipulating the power key, confirming the powering-on, opening the switch cover, and continuing to manipulate the distress key for 3 sec. Because of setup of the radio apparatus, it takes about 5 sec from manipulation of the power key to the distress key's becoming manipulatable. Thus, in a state that the radio apparatus is powered off, a time lag of at least about 8 sec occurs from a start of manipulation of the power key to transmission of a distress signal.

As such, in conventional radio apparatuses, it is difficult to send a distress signal quickly in a state that they are powered off.

SUMMARY

According to embodiments, a radio apparatus is capable of quickly sending a distress signal merely by a user's manipulating a distress key without manipulating a power key even if the radio apparatus is powered off.

According to embodiments, a radio apparatus includes a control unit, a power unit, a distress key and a transmission unit. When the distress key is manipulated, a distress key manipulation signal is output to the control unit and the power unit. When the power unit receives the distress key manipulation signal during a power supply is stopped, the power unit supplies power to the control unit and the transmission unit. When the control unit receives power from the power unit, the control unit starts setting up the radio apparatus and counts a time that the control unit continuously receives the distress key manipulation signal. When the control unit continuously receives the distress key manipulation signal for a preset time or longer, the control unit outputs a power supply maintenance signal to the power unit, generates the distress signal, and causes the transmission unit to send the distress signal.

According to embodiments, it possible to send a distress signal quickly even in a power-off state, unlike in conventional radio apparatuses.

Other aspects and advantages of the invention will be apparent from the following description and the appended claims.

DETAILED DESCRIPTION

Figure 1:
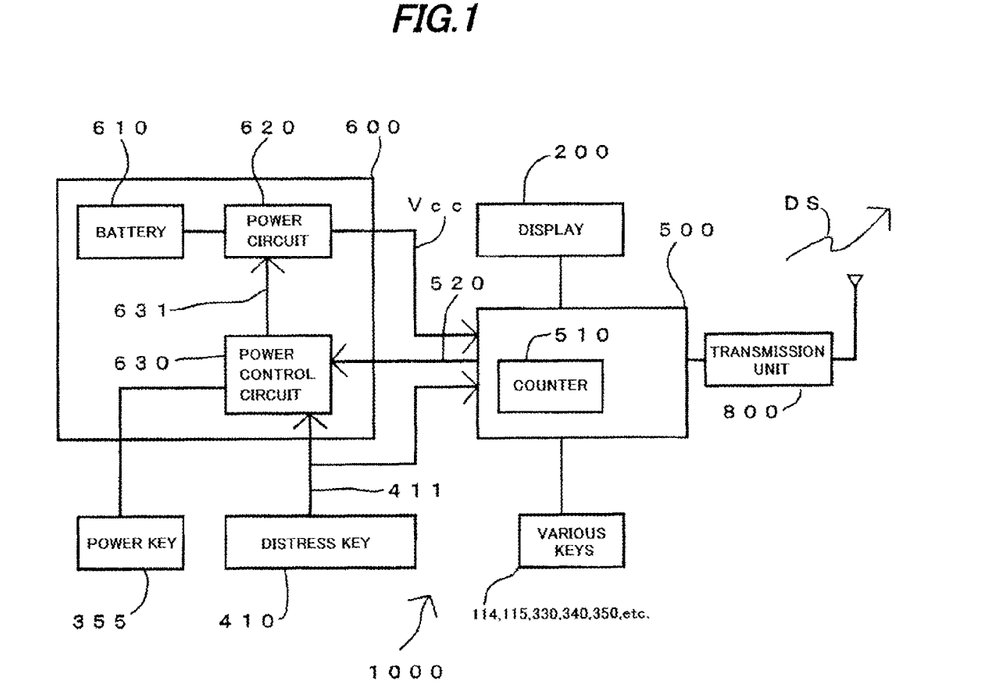
FIG. 1 is a general block diagram of a radio apparatus according to an embodiment.

According to an exemplary embodiment, a radio apparatus 1000 has a function of sending a distress signal DS. The radio apparatus 1000 is equipped with a control unit 500 for generating a distress signal DS including at least an ID code and position information of the self station, a power unit 600 for supplying a voltage Vcc to the entire radio apparatus 1000, a distress key 410 to be manipulated for transmission of the distress signal DS, and a transmission unit 800 for sending the distress signal DS.

When manipulated, the distress key 410 outputs a distress key manipulation signal 411 to the control unit 500 and the power unit 600. The power unit 600 supplies the voltage Vcc to at least the control unit 500 and the transmission unit 800 when receiving the distress key manipulation signal 411 in a state that supply of the voltage Vcc to the entire radio apparatus 1000 is stopped.

When supplied with the voltage Vcc from the power unit 600, the control unit 500 starts setting up the radio apparatus 1000, starts measuring, by counting, a time during which it continues to receive the distress key manipulation signal 411. Furthermore, if the control unit 500 has continued to receive the distress key manipulation signal 411 for a preset time (e.g. 3 sec) or longer, the control unit 500 outputs a power supply maintenance signal 520 to the power unit 620, generates the distress signal DS, and causes the transmission unit 800 to send the distress signal DS.

The radio apparatus 1000 performs a radio communication in a marine VHF band. A typical example of the radio apparatus 1000 is a radio apparatus for ships that has a digital selective calling (DSC) function. This kind of radio apparatus 1000 for ships has a function of sending a distress signal DS when the ship or a person(s) is in distress and requires rescue. The radio apparatus 1000 sends a distress signal DS when the distress key 410 is manipulated which is provided independently of the other switches.

It is necessary that the distress signal DS include MMSI which is an ID code of the self station, information indicating a position of the self station, time information, and a distress type. There are 11 distress types, that is, fire/explosion ("explosion"), "flooding", "collision", "grounding", "capsizing", "sinking", incapability of steering the ship/adrift ("adrift"), "piracy", abandoning of the ship ("abandoning"), fallen off into water ("MOB"), and "undesignated distress". Usually, a distress type may be selected by displaying a menu picture on a display 200 and manipulating prescribed key switches.

Figure 2A:
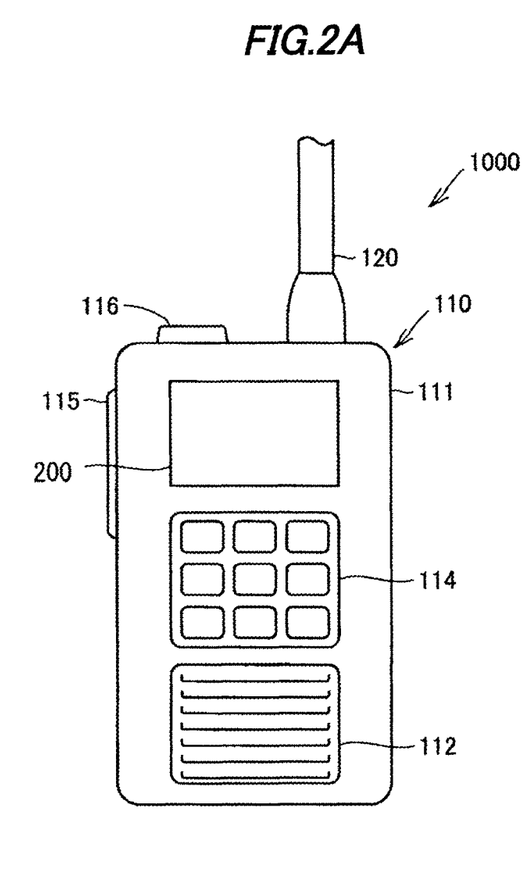
FIG. 2A is a schematic front view of a handy radio apparatus.

The appearance of the radio apparatus 1000 according to the exemplary embodiment will be described in detail with reference to FIGS. 2A to 2C.

The radio apparatus 1000, which is of a handy type, has an appearance that a body 110 includes a case 111 and an antenna 120 is installed on the top surface of the case 111. The antenna 120 is a rod-shaped antenna in which a coil-shaped antenna wire is housed in a resin pipe. Since the antenna wire is heavy because it is a copper or ion wire, the weight balance of the radio apparatus 1000 may be such that the center of gravity is deviated upward.

A display 200, a key panel 114, and a speaker grille 112 are arranged in this order from above on the front surface of the case 111.

A speaker SP is installed inside the speaker grille 112. A PTT (push-to-talk) switch 115 is disposed on the left side surface (when viewed from the front side) of the case 111. An SP/MIC connector 116 covered with a water-proof cap is disposed on the top surface of the case 111 on the left of the antenna 120 (when viewed from the front side).

The display 200 is a liquid crystal display and an LED(s) is disposed on the back side as a backlight. Various setting items such as a communication channel and a sound volume are displayed on the display 200.

Plural key switches including a power key 355 (see FIG. 1) and ten keys are arranged in the key panel 114. The power key 355 is a key switch for turning on/off the power. If the power key 355 is pushed for a prescribed time (e.g., 2 sec) or longer in a state that the radio apparatus 1000 is powered off, a power supply signal 631 is output from a power control circuit 630 to a power circuit 620. Upon receiving the power supply signal 631, the power circuit 620 starts to supply a voltage Vcc of a battery 610 continuously to individual units of the radio apparatus 1000.

If the power key 355 is pushed for a prescribed time (e.g., 2 sec) or longer in a state that the radio apparatus 1000 is powered on, the supply of the voltage Vcc from the battery 610 to the individual units of the radio apparatus 1000 is stopped.

An LED(s) as a backlight is disposed in the rear of the key panel 114. The key top of each of the key switches of the key panel 114 is made of such a material and has such a color as to transmit light, and is illuminated from the back side when the backlight is lit.

Figures 2B, 2C:
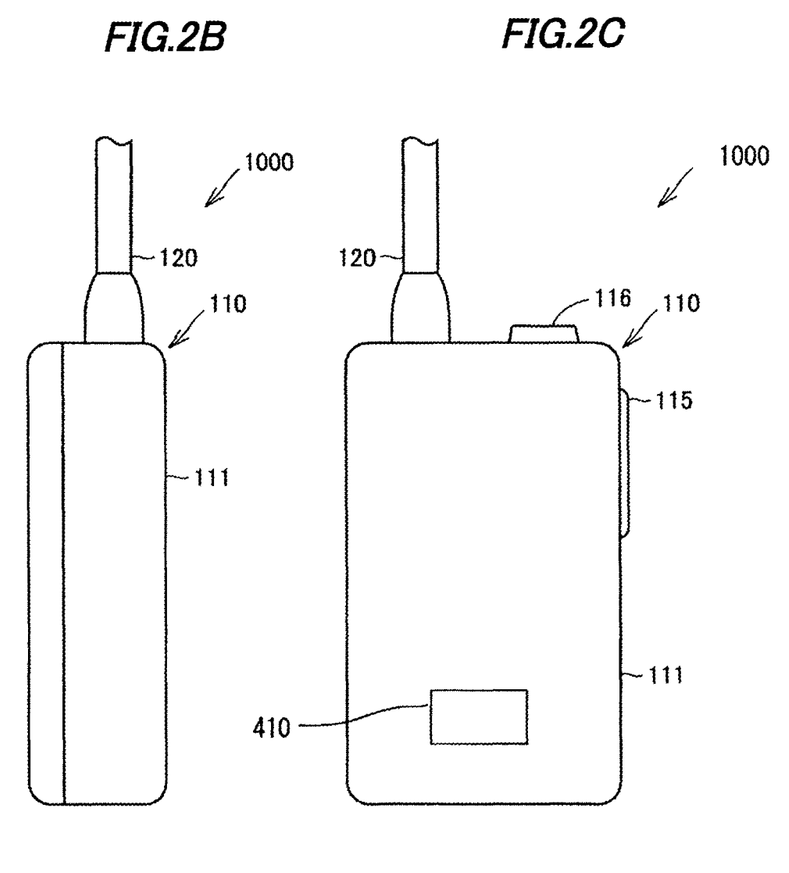
FIG. 2B is a schematic side view of the handy radio apparatus.
FIG. 2C is a schematic rear view of the handy radio apparatus.

Furthermore, in the handy radio apparatus 1000, as shown in FIG. 2C, the back surface of the case 111 is provided with the distress key 410 which is to be manipulated for transmission of a distress signal DS. Alternatively, even in the handy radio apparatus 1000, the distress key 410 may be disposed on the front surface or a side surface depending on an installation space available for it. The distress key 410 is an auto-recovery push switch which is kept on only while it is being pushed.

The above-described arrangements of the various keys etc. are just example, and it goes without saying that the invention is not limited to it.

Whereas the handy radio apparatus 1000 has been described above, as shown in FIG. 3 the radio apparatus 1000 may be of a stationary type. In this specification, the constituent elements are given the same reference symbols irrespective of whether the handy radio apparatus 1000 is of the handy type or the stationary type.

Figure 3:
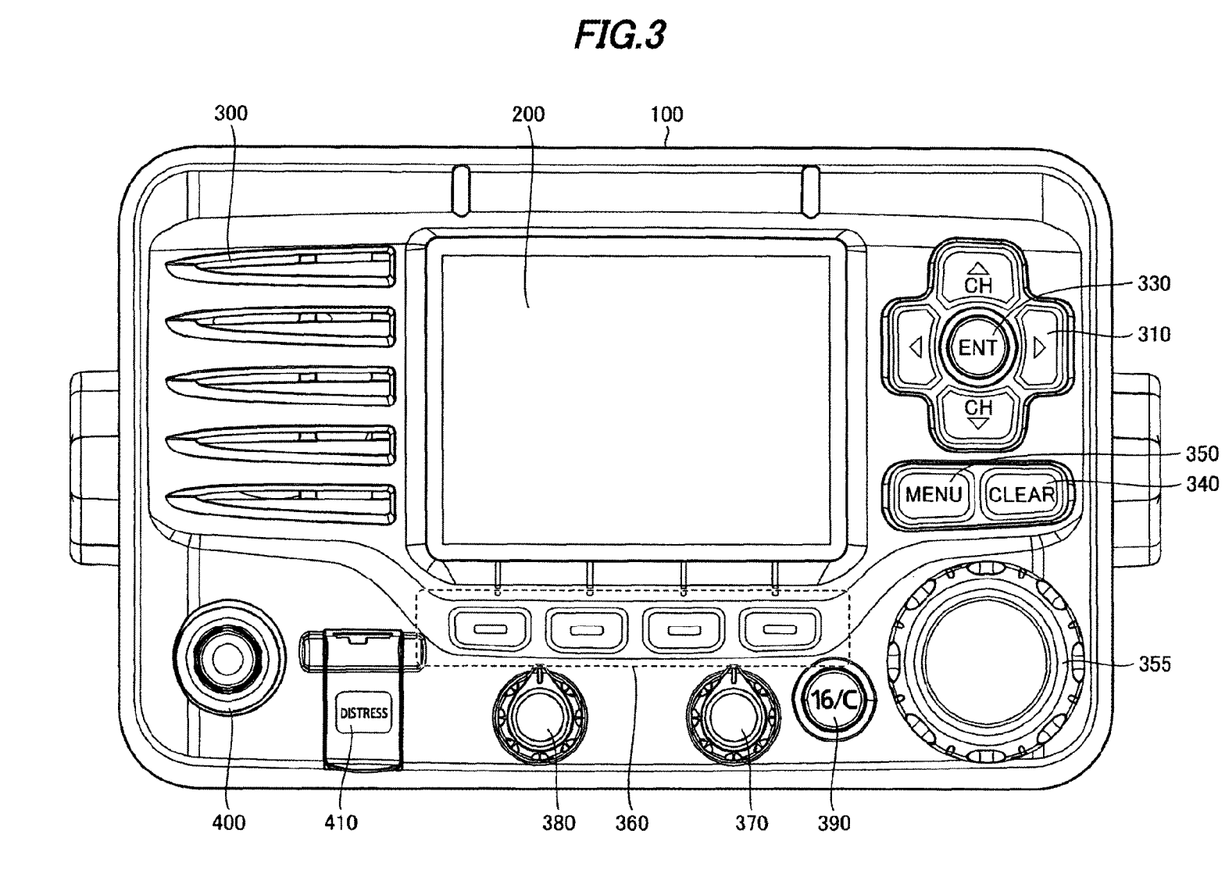
FIG. 3 is a schematic front view of a stationary radio apparatus.

In the stationary radio apparatus 1000, as shown in FIG. 3, a display 200 which is a liquid crystal panel is disposed at the center. A speaker 300 and a cross key 310 are disposed on the left of and on the right of the display 200, respectively, when viewed from the front side. An enter key 330 is disposed at the center of the cross key 310, a clear key 340 and a menu key 350 are disposed under the cross key 310, and a power key 355 which also serves as a dial selector is disposed under the clear key 340 and the menu key 350.

Four soft keys 360 are disposed under the display 200 so as to be arranged in the horizontal direction, and a squelch knob 370, a volume knob 380, and a channel-16 call channel key 390 are disposed under the four soft keys 360 so as to be arranged in the horizontal direction.

Furthermore, a microphone connector 400 and a distress key 410 are disposed under the speaker 300 so as to be arranged in the horizontal direction. To prevent an erroneous manipulation, the distress key 410 is covered with a red, transparent switch cover.

The distress key 410 is an auto-recovery push switch which is kept on only while it is being pushed. The arrangement of the above-described various front-side keys is just an example, and it goes without saying that the invention is not limited to it.

The power unit 600 of the (handy or stationary) radio apparatus 1000 is equipped with the battery 610, the power circuit 620, and the power control circuit 630. The power circuit 620 supplies the voltage Vcc of the battery 610 to the individual units of the radio apparatus 1000. In response to a manipulation on the power key 355 or the distress key 410, the power control circuit 630 controls the power circuit 620 so that it supplies the voltage Vcc of the battery 610 to the individual units of the radio apparatus 1000.

In the handy radio apparatus 1000, the battery 610 is a battery pack that is detachable from the main body of the radio apparatus 1000 or a chargeable built-in battery. In the stationary radio apparatus 1000, the battery 610 is an external battery that is separate from the radio apparatus 1000 and is connected to the radio apparatus 1000 by a DC power cable. To facilitate understanding, FIG. 1 is drawn in such a manner that the battery 610 is included in the power unit 600 irrespective of its actual form. The battery type does not influence operations to be described below.

The control unit 500 of the radio apparatus 1000 is a microcontroller which is equipped with a CPU, memories, various interfaces, an A/D converter, a D/A converter, etc. The control unit 500 of the radio apparatus 1000 controls the whole of operations of the radio apparatus 1000. The control unit 500 is equipped with a counter 510 for measuring, by counting, a time during which the distress key 410 is manipulated continuously, that is, a distress key manipulation signal 411 continues to be input to the control unit 500.

When push-manipulated, the distress key 410 outputs a distress key manipulation signal 411 to the control unit 500 and the power control circuit 630 of the power unit 600 irrespective of whether the radio apparatus 1000 is powered on or off.

When the distress key 410 is manipulated in a state that the radio apparatus 1000 is powered off and a distress key manipulation signal 411 is thereby output from the distress key 410, a power supply signal 631 is output from the power control circuit 630 to the power circuit 620. When receiving the power supply signal 631, the power circuit 620 starts supplying the voltage Vcc of the battery 610 to the control unit 500 and the other individual units of the radio apparatus 1000, whereupon setup of the control unit 500 and the other individual units of the radio apparatus 1000 is started.

This supply of the voltage Vcc is temporary; that is, the supply of the voltage Vcc from the power unit 600 is stopped as soon as the output of the distress key manipulation signal 411 is stopped.

On the other hand, when the distress key 410 is manipulated in a state that the radio apparatus 1000 is powered on and a distress key manipulation signal 411 is thereby output from the distress key 410, a transition is made to a distress signal transmissible mode without execution of any additional operation because it is not necessary to output a power supply signal 631 to the power circuit 620 or to set up the entire radio apparatus 1000.

Although in this specification the distress signal transmissible mode is a mode in which a distress signal DS to be sent is generated as a result of a manipulation of the distress key 410. If a distress signal DS is generated in the distress signal transmissible mode, the control unit 500 causes the transmission unit 800 to send the distress signal DS.

While the above-mentioned setup is being performed as a result of output of a distress key manipulation signal 411 with the radio apparatus 1000 powered off, the control unit 500 starts operation of the counter 510. The counter 510 measures, by counting, a time during which the distress key manipulation signal 411 continues to be input to the control unit 500.

If the time during which the distress key manipulation signal 411 has continued to be input to the control unit 500 reaches a preset time (e.g., 3 sec), the control unit 500 outputs a power supply maintenance signal 520 to the power control circuit 630. Receiving the power supply maintenance signal 520, the power control circuit 630 controls the power circuit 620 so that it continues to supply the voltage Vcc of the battery 610 to the entire radio apparatus 1000.

The reason why in the radio apparatus 1000 the distress signal transmissible mode is established only when the distress key 410 has continued to be manipulated for the preset time (e.g., 3 sec) is to prevent an event that a distress signal DS is sent erroneously because the user touches the distress key 410 inadvertently or something comes into contact with it.

Figure 4:
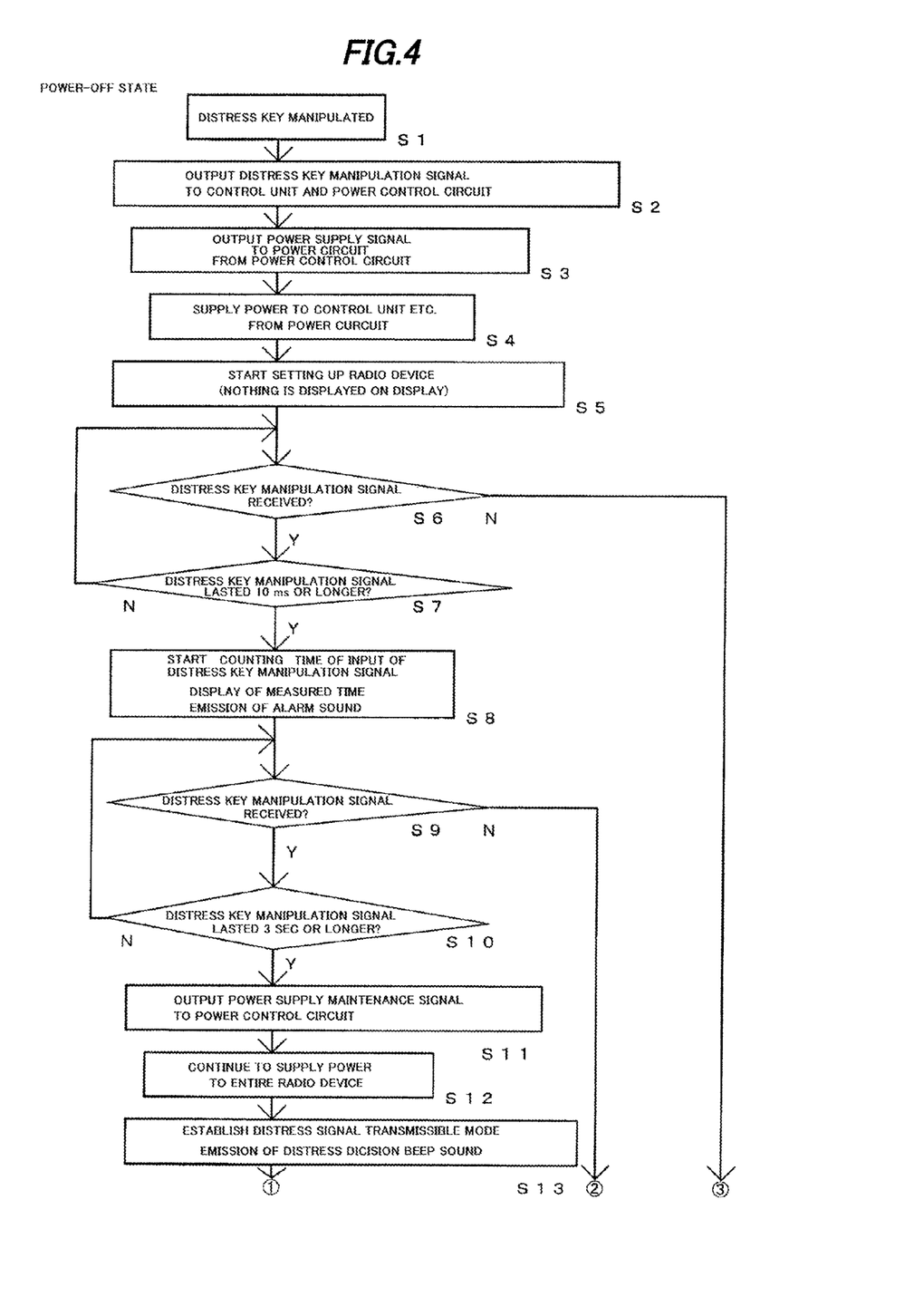
FIG. 4 is a general flowchart illustrating a first half of a process that is executed by the radio apparatus according to the embodiment.

Next, referring to FIGS. 4 and 5, a more detailed description will be made of how the radio apparatus 1000 having the above configuration operates starting from a state that it is powered off.

If the distress key 410 is manipulated in a state that the radio apparatus 1000 is powered off (step S1 shown in FIG. 4), at step S2 a distress key manipulation signal 411 is output simultaneously to the control unit 500 and the power control circuit 630 of the power unit 600. Receiving the distress key manipulation signal 411, at step S3 the power control circuit 630 outputs a power supply signal 631 to the power circuit 620. Receiving the power supply signal 631, at step S4 the power circuit 620 supplies the voltage Vcc of the battery 610 to the control unit 500 and the other units of the radio apparatus 1000.

Supplied with the voltage Vcc, at step S5 the control unit 500 start setting up the radio apparatus 1000. Thus, when the distress key 410 is manipulated in a state that the radio apparatus 1000 is powered off, the distress key 410 plays the role of the power key 355.

At this time point, whereas the voltage Vcc is supplied to the units including the control unit 500 that are necessary for the setup, it is not supplied to the units that are not necessary for the setup such as the display 200. Thus, at this time point (step S5), nothing is displayed on the display 200.

As for the setup of the radio apparatus 1000 that is performed this time, the units that are necessary for sending a distress signal DS are set up first and pieces of processing that are to be performed upon ordinary power-on and take time, such as loading of various data, are performed later. That is, minimum necessary setup for sending a distress signal DS is performed first to establish a state that the radio apparatus 1000 can send a distress signal DS, and then setup for rendering the other functions workable, that is, setup for enabling the ordinary functions of the radio apparatus 1000, is performed. Giving priority order to the pieces of setup processing in this manner makes it possible to send a distress signal DS quickly from a state that the radio apparatus 1000 is powered off.

This supply of the voltage Vcc is temporary; that is, the supply of the voltage Vcc is stopped as soon as the input of the distress key manipulation signal 411 to the power control circuit 630 is stopped.

If the distress key manipulation signal 411 is being input to the control unit 500 (S6: yes) and has continued to be input to the control unit 500 for a preset time (e.g., 10 ms) (S7: yes), at step S8 the counter 510 of the control unit 500 starts measuring, by counting, a time during which the control unit 500 continues to receive the distress key manipulation signal 411. At the same time, display of the time during which the control unit 500 has continued to receive the distress key manipulation signal 411 and emission of an alarm sound from the speaker 300 are started.

Figure 5:
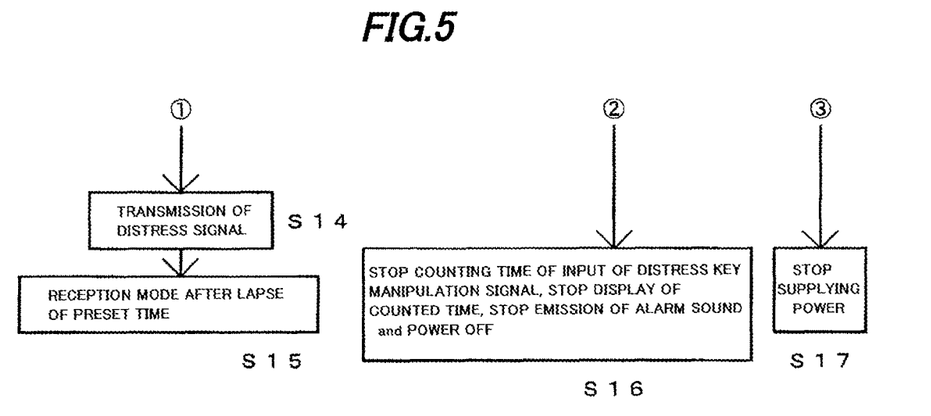
FIG. 5 is a general flowchart illustrating a second half of the process that is executed by the radio apparatus according to the embodiment.

On the other hand, if the input of the distress key manipulation signal 411 is stopped before a lapse of 10 ms (S7 and S6: no), the supply of the voltage Vcc from the power unit 600 to the control unit 500 etc. is stopped (S17; see FIG. 5). As a result, the control unit 500 does not cause time measurement by the counter 510, display of a measured time by the display 200, or emission of an alarm sound.

The reason why the control unit 500 does not cause the counter 510 to start a time measurement if the control unit 500 has not continue to receive the distress key manipulation signal 411 for, for example, 10 ms or longer (S7: no) is to prevent an event that a time measurement is started by chattering or an inadvertent, instantaneous manipulation of the distress key 410.

If the input of the distress key manipulation signal 411 to the control unit 500 has continued for a preset time (e.g., 3 sec) from its start without interruption (S9 and S10: yes), at step S11 the control unit 500 outputs a power supply maintenance signal 520 to the power control circuit 630. If the power control circuit 630 receives the power supply maintenance signal 520, at step S12 the power unit 600 continues to supply the voltage Vcc to the entire radio apparatus 1000, that is, the control unit 500 and the other units.

That is, even if the manipulation of the distress key 410 is stopped after this time point to terminate the input of the distress key manipulation signal 411 to the control unit 500 and the power control circuit 630, the supply of the voltage Vcc from the power unit 600 to the control unit 500 etc. is continued and the radio apparatus 1000 is kept on.

At step S13, the radio apparatus 1000 is rendered into the distress signal transmissible mode. To indicate the establishment of the distress signal transmissible mode, the radio apparatus 1000 emits a distress decision beep sound. It is desirable that the distress decision beep sound be clearly distinguishable from the above-mentioned alarm sound for indicating continuous input of a distress key manipulation signal 411 to the control unit 500.

At step S13, the control unit 500 acquires MIVISI which is an ID code of the self station, information indicating a position of the self station, and time information from a storage unit (not shown) etc. and generates a distress signal DS in which the distress type is set to "undesignated distress" which is an initial one.

Upon the generation of the distress signal DS, at step S14 (see FIG. 5) the control unit 500 causes the transmission unit 800 to send it. If a preset time has elapsed from the sending of the distress signal DS by the transmission unit 800, at step S15 the radio apparatus 1000 is automatically rendered into a reception mode for receiving an ACK (acknowledgment) signal from another device.

If the input of the distress key manipulation signal 411 to the control unit 500 is stopped before a lapse of the preset time (e.g., 3 sec) (S10 and S9: no), at step S16 (see FIG. 6) the setup of the entire radio apparatus 1000 and the time measurement by the counter 510 are stopped. At the same time, the display of the manipulation time of the distress key 410 on the display 200 and the emission of the alarm sound are stopped. Since the output of the power supply signal 631 is also stopped, the supply of the voltage Vcc to the control unit 500 etc. is also stopped and the power-off state of the radio apparatus 1000 is restored.

The fact that the input of the distress key manipulation signal 411 to the control unit 500 is stopped before a lapse of the preset time (e.g., 3 sec) means that the manipulation of the distress key 410 has been stopped before a lapse of the preset time (e.g., 3 sec) from the start of the manipulation. The reason why the power-off state of the radio apparatus 1000 is restored if the manipulation of the distress key 410 is stopped before a lapse of the preset time (e.g., 3 sec) is to prevent erroneous transmission of a useless distress signal DS due to an inadvertent manipulation of the distress key 410.

An operation that is performed in a state that the radio apparatus 1000 is powered on will be described below.

If the distress key 410 is manipulated in a state that the radio apparatus 1000 is powered on, a distress key manipulation signal 411 is output to the control unit 500 as in the case that the distress key 410 is manipulated in a state that the radio apparatus 1000 is powered off. When the distress key manipulation signal 411 is input to the control unit 500, the counter 510 of the control unit 500 starts measuring, by counting, a time during which the distress key manipulation signal 411 continues to be input to the control unit 500. At the same time, display, on the display 200, of the time during which the distress key manipulation signal 411 has continued to be input to the control unit 500 and emission of an alarm sound from the speaker 300 are started.

If the input of the distress key manipulation signal 411 to the control unit 500 is stopped before a lapse of the preset time (e.g., 3 sec), the time measurement by the counter 510, the time display by the display 200, and the emission of the alarm sound are stopped.

If the input of the distress key manipulation signal 411 to the control unit 500 has continued for a preset time (e.g., 3 sec) from its start without interruption, the control unit 500 renders the radio apparatus 1000 into the distress signal transmissible mode. To indicate that the radio apparatus 1000 has been rendered in the distress signal transmissible mode, the control unit 500 causes emission of a distress decision beep sound.

To indicate that the distress key manipulation signal 411 has continued to be input to the control unit 500, it is desirable that the distress decision beep sound be clearly distinguishable from the above-mentioned alarm sound.

To have a distress type other than "undesignated distress" which is the initial one included in a distress signal DS, the user selects the intended distress type by manipulating a necessary key(s) before manipulating the distress key 410. Other pieces of information to be incorporated in the distress signal DS such as MIVISI which is the ID code of the self station, information indicating a position of the self station, and time information are acquired from the storage unit (not shown) etc. and automatically incorporated into the distress signal DS by the control unit 500.

If no distress type is selected by the user, "undesignated distress" is selected automatically.

As soon as a distress signal DS including a distress type, MMSI which is the ID code of the self station, information indicating a position of the self station, and time information is generated, the control unit 500 causes the transmission unit 800 to send the distress signal DS.

If a preset time has elapsed from the transmission of the distress signal DS by the transmission unit 800, the control unit 500 automatically renders the radio apparatus 1000 into a reception mode for receiving an ACK (acknowledgment) signal from another device.

If the manipulation of the distress key 410 that was started in a state that the radio apparatus 1000 was powered on is stopped before a lapse of the preset time (e.g., 3 sec), the input of the distress key manipulation signal 411 to the control unit 500 is stopped immediately. At the same time, the display, on the display 200, of the time of continuous input of the distress key manipulation signal 411 to the control unit 500 and the emission of the alarm sound are stopped. The radio apparatus 1000 is not rendered into the distress signal transmissible mode. As a result, the control unit 500 neither generate a distress signal DS nor cause the transmission unit 800 to send a distress signal DS. The radio apparatus 1000 continues to be kept powered on.

DESCRIPTION OF SYMBOLS

1000: Radio apparatus
355: Power key

410: Distress key
411: Distress key manipulation signal
500: Control unit
520: Power supply maintenance signal
600: Power unit
800: Transmission unit
DS: Distress signal

What is claimed is:

1. A radio apparatus comprising:
   a control unit configured to generate a distress signal including at least an ID code and position information of the radio apparatus;
   a power unit configured to supply power to an entire of the radio apparatus;
   a distress key to be manipulated for transmission of the distress signal; and
   a transmission unit configured to send the distress signal,
   wherein the distress key is configured to output a distress key manipulation signal to the control unit and the power unit in response to a manipulation of the distress key,
   wherein the power unit is configured to supply power to at least the control unit and the transmission unit in response to receiving the distress key manipulation signal in a state that a power supply to the entire of the radio apparatus is stopped,
   wherein the control unit is configured to start setting up the radio apparatus and to count a time during which the control unit continues to receive the distress key manipulation signal, in response to receiving power from the power unit, and
   wherein the control unit is configured to output a power supply maintenance signal to the power unit, to generate the distress signal, and to cause the transmission unit to send the distress signal, in response to continuous receiving the distress key manipulation signal for a preset time or longer.

2. The radio apparatus according to claim 1, wherein the power unit is configured to continue to supply power to the entire of the radio apparatus in response to receiving the power supply maintenance signal.

3. The radio apparatus according to claim 1, wherein the control unit is configured to set up the radio apparatus to perform minimum necessary setup for transmission of the distress signal, and configured to perform setup for enabling ordinary functions of the radio apparatus after completing the minimum necessary setup.

4. The radio apparatus according to claim 2, wherein the control unit is configured to set up the radio apparatus to perform minimum necessary setup for transmission of the distress signal, and configured to perform setup for enabling ordinary functions of the radio apparatus after completing the minimum necessary setup.

5. A method of sending a distress signal in a radio apparatus, the method comprising:
   outputting a distress key manipulation signal to a control unit and a power unit when a distress key is manipulated;
   supplying power to the control unit and a transmission unit when the power unit receives the distress key manipulation signal in a state that a power supply to an entire of the radio apparatus is stopped;
   starting setting-up the radio apparatus and counting a time during which the control unit continues to receive the distress key manipulation signal, when the control unit receives power from the power unit; and
   outputting a power supply maintenance signal from the control unit to the power unit, and generating the distress signal so that the transmission unit sends the distress signal, when the control unit continuously receives the distress key manipulation signal for a preset time or longer.

6. The method according to claim 5, further comprising:
   continuing to supply power to the entire of the radio apparatus when the power unit receives the power supply maintenance signal.

7. The method according to claim 5, further comprising:
   setting up the radio apparatus to perform minimum necessary setup for transmission of the distress signal, and performing setup for enabling ordinary functions of the radio apparatus after completing the minimum necessary setup.

8. The method according to claim 6, further comprising:
   setting up the radio apparatus to perform minimum necessary setup for transmission of the distress signal, and performing setup for enabling ordinary functions of the radio apparatus after completing the minimum necessary setup.

* * * * *

UNITED STATES PATENT AND TRADEMARK OFFICE
CERTIFICATE OF CORRECTION

| | |
|---|---|
| PATENT NO. | : 9,786,135 B1 |
| APPLICATION NO. | : 15/449154 |
| DATED | : October 10, 2017 |
| INVENTOR(S) | : Yoshio Sekiyama |

It is certified that error appears in the above-identified patent and that said Letters Patent is hereby corrected as shown below:

In the Specification

Column 8, Line 34, "MIVISI" should read --MMSI--.

Signed and Sealed this
Twentieth Day of March, 2018

Andrei Iancu
*Director of the United States Patent and Trademark Office*